July 3, 1923. 1,460,714

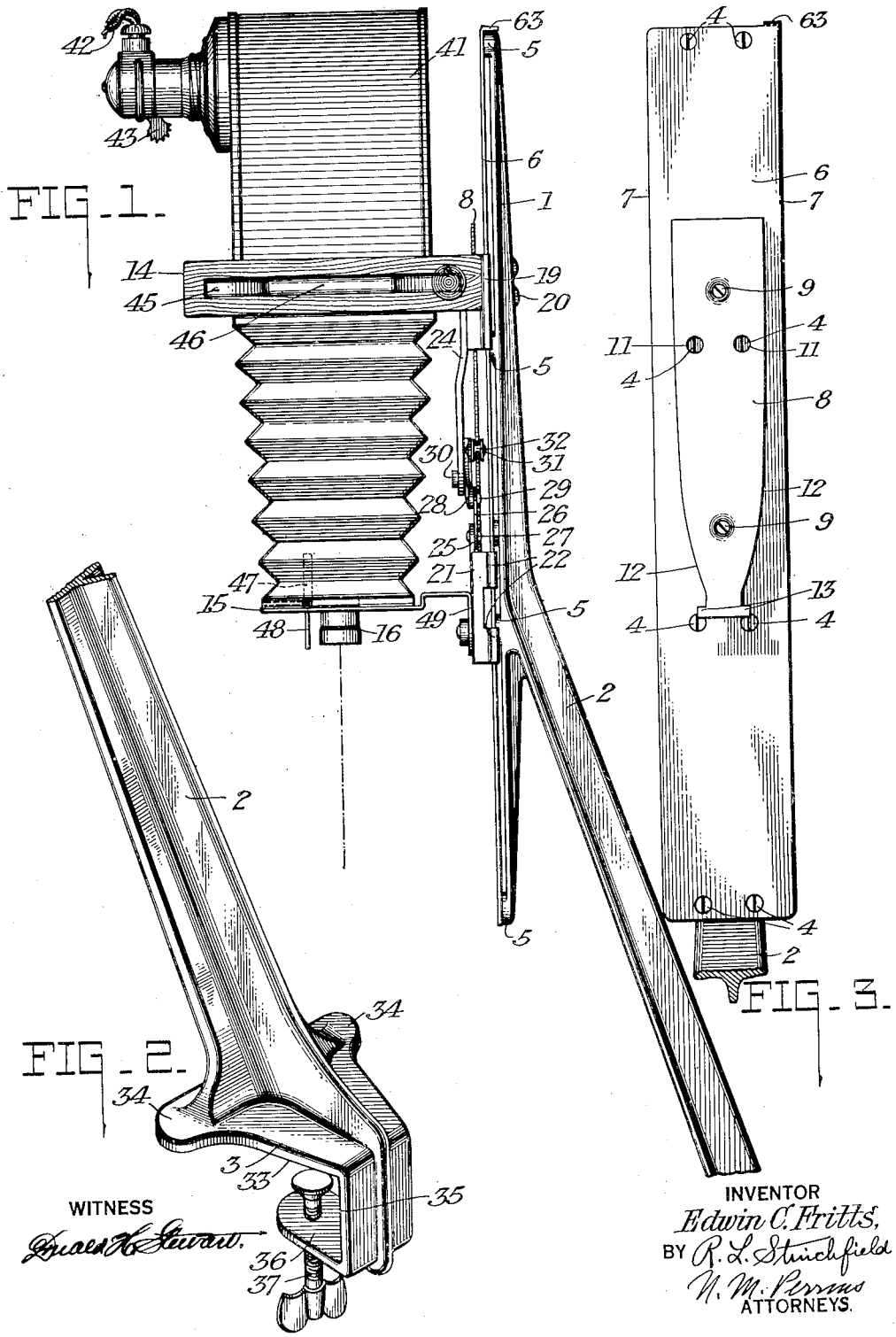

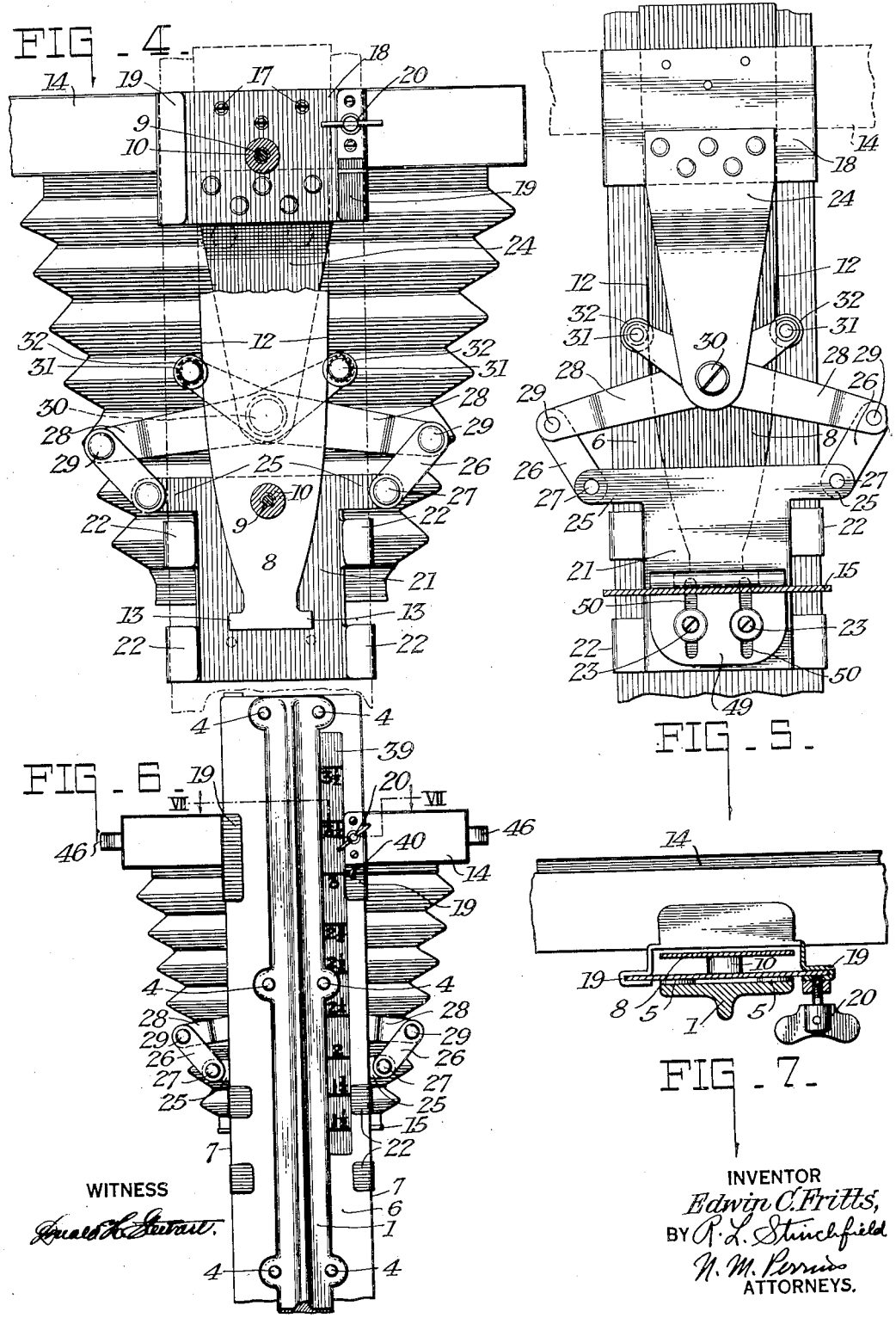

E. C. FRITTS

ENLARGING CAMERA

Filed May 12, 1921 3 Sheets-Sheet 3

WITNESS

INVENTOR
Edwin C. Fritts,
BY
ATTORNEYS.

Patented July 3, 1923.

1,460,714

UNITED STATES PATENT OFFICE.

EDWIN C. FRITTS, OF URBANA, ILLINOIS, ASSIGNOR TO EASTMAN KODAK COMPANY, OF ROCHESTER, NEW YORK, A CORPORATION OF NEW YORK.

ENLARGING CAMERA.

Application filed May 12, 1921. Serial No. 469,077.

*To all whom it may concern:*

Be it known that I, EDWIN C. FRITTS, a citizen of the United States of America, residing at Urbana, in the county of Champaign and State of Illinois, have invented certain new and useful Improvements in Enlarging Cameras, of which the following is a full, clear, and exact specification.

This invention relates to enlarging cameras and particularly to those of the type in which the elements of the camera are so connected that the camera will be automatically kept in focus. The principal object of this invention is to make a camera of this type which is adapted for use by the ordinary amateur,—that is, it must be so compact that it can be easily stored away; it must be simple in operation, so that no high degree of skill will be required for setting up and using it, and it must be so simple to make that it can be manufactured in quantity for a comparatively small sum. I have achieved this object by mounting the camera upon a single rigid base, at the bottom of which is a clamp adapted to grasp a table top and which is so designed that the camera will be held directly above such a table top as an easel. The mechanism controlling the automatic focusing is placed in the immediate vicinity of the camera, so that there is no need of complicated mechanism which will easily get out of order. The lens board and negative holder are so connected by this mechanism that in all positions the image is brought to a focus in the plane of the easel. Other features and objects of my invention will be brought out in the course of the following description.

Referring to the drawings throughout which the same reference characters refer to the same parts:

Fig. 1 is an elevation of the upper part of the stand and the camera;

Fig. 2 is a perspective view of the lower part of the stand and the clamp;

Fig. 3 is an elevation of the camera guideway and the cam secured to it;

Fig. 4 is a view of the camera from the rear with the stand removed, but a portion of the cam is shown;

Fig. 5 is a view showing the automatic focusing mechanism and the immediately connected parts;

Fig. 6 is a view from the rear of the top part of the stand and the camera;

Fig. 7 is a fragmentary view substantially on the line VII—VII of Fig. 6;

Figure 8:
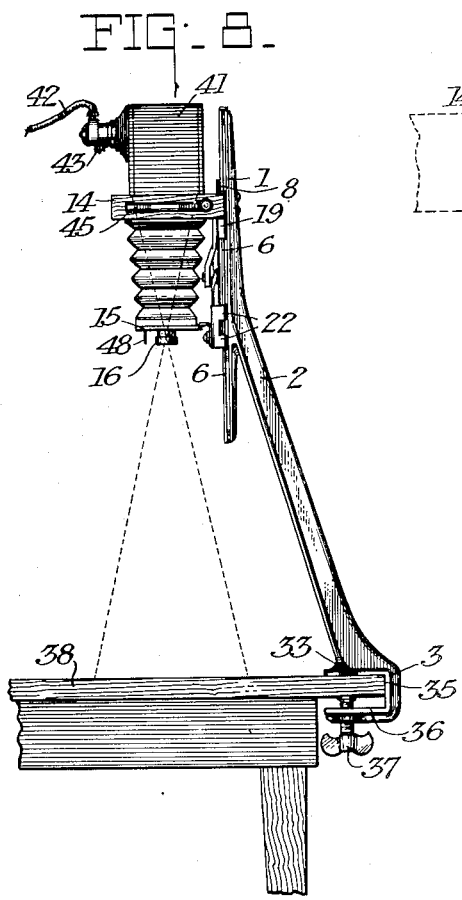
Fig. 8 is a side elevation of the stand and camera in position.

The stand for the camera is a rigid support, preferably made of a single casting, and comprises a portion 1 which is vertical when the parts are in use, a portion 2 arranged obliquely thereto and at the bottom of which is a clamp 3, which will be more fully described later. Rigidly carried by the vertical portion 1, as by screws 4, and spaced slightly from the support 1 by means of bosses 5 through which the screws pass, is a guideway 6 consisting of a flat sheet of metal having straight vertical edges 7. Carried by this guideway 6 is a cam plate 8 secured thereto by screws 9 and spaced therefrom by bosses 10 through which the screws 9 pass. Apertures 11 in the cam plate give access to certain of the screws 4.

The opposite side edges of the cam are symmetrically shaped to constitute convexly curved cam edges 12. Below these cam edges are outwardly extending projections 13. Slidable on the guideway 6 are the negative holder 14 and the lens holder 15. The negative holder is of the usual type, having a slide 45 removable by a handle 46 and adapted to carry in a fixed predetermined position in the holder a flat negative, transparency or sheet of usual type. Secured to the edge of the holder, as by screws 17, is a sheet metal support 18 having turned over edges 19 adapted to surround the edges 7 of the guideway 6, thus affording a sliding connection between the holder and the guideway. These are made to fit so that they will slide readily but without binding or rattling. The holder may be secured in any desired position by means of a thumb screw 20 carried by one of the flanges 19 and engaging the back of the guideway 6. As is clearly shown in Fig. 6, the guideway is broader than the support 1, so that there is ample room for this clamp.

The lens board 15 carries a lens mount 16 in which is a lens of any preferred type, and pivoted thereto is a screen holder 47 containing a screen which transmits only non-actinic light and controlled by a handle 48, so as to permit inspection of the image on the easel in the usual way. The lens board 15 has a turned up foot 49 in which are slots 50. This foot is secured rigidly against a support 21 of sheet metal, which has side flanges 22 engaging the edges 7 of the guideway 6. Screws 23 passing through the slots 20 secure them together. By reason of the slots, adjustment of the lens may be made in view of the slight difference in focal length of lenses that may be used. When the mechanism is once fixed for a particular lens, however, it is not ordinarily readjusted.

Riveted to the supporting plate 18 of the negative holder is a downwardly extending arm 24, and carried by the supporting plate 21 of the lens holder are two outwardly projecting lugs 25. Symmetrical links 26 are pivoted to these lugs at 27 and symmetrically arranged levers 28 are pivoted to the links at 29, the levers crossing each other and being connected by a common pivot screw 30 to the arm 24. The opposite ends of the levers carry pivot pins 31 projecting from one side thereof, upon which are secured rollers 32 with grooved edges which engage the convex cam edges 12.

The clamp 3 has an upper flat bearing surface 33 with outwardly extending lugs 34 and a back surface 35 perpendicular to the bearing surface 33, and a lower jaw 36 parallel to the surface 33 and through which passes a thumb screw 37. This clamp is placed around the edge of any suitable supporting surface, as, for instance, a table top 38, the edge of the top engaging against the back surface 35 and a screw 37 clamping the parts rigidly in position. The clamp, therefore, accurately positions the support and the camera with respect to the easel to which it is attached and in such a way that the guideway 6 is above and perpendicular to the easel area. When the negative holder is moved up and down by the user, motion will be communicated through the link mechanism described to the negative holder, and the cam surface and the lever mechanism are so designed with reference to the focal length of the lens for which the apparatus is adapted that the lens will maintain in focus upon the easel an image of the negative carried in the negative holder, and the support is so designed that for all positions of the camera, the structure of it will be outside of the useful field of the camera. The abutments 13 at the bottom of the cam member 8 serve as stops, limiting the movement of the rollers 32 and thus of the camera elements, and the turned over lug 63 limits the upward movement of parts 19.

On the rear of the guideway 6 is carried a scale 39 and upon the corresponding flange 19 is a pointer 40. The scale is graduated in terms of magnification, so that the user may at once position the camera to give the desired degree of enlargement.

Carried by the negative holder is an illuminator 41 carrying an electric lamp which in turn is connected by a wire 42 and controlled by a switch 43 in the customary way.

Figure 9:
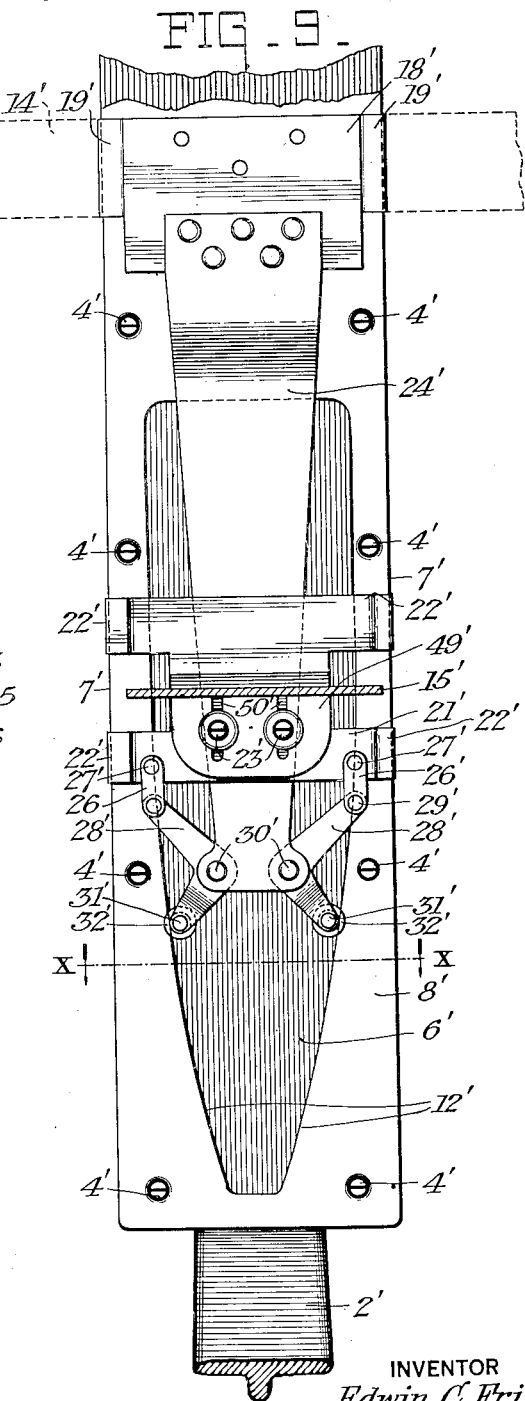
Fig. 9 is a view showing a different form of cam and connected mechanism and immediately connected parts.
Figure 10:
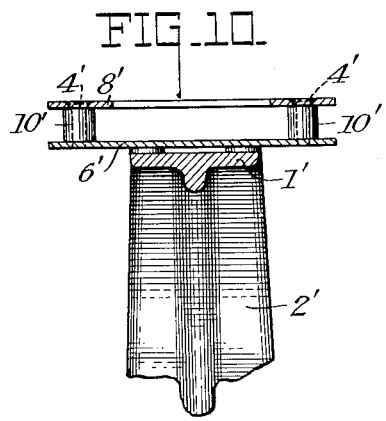
Fig. 10 is a section on line X—X of Fig. 9.

Considerable variation is permissible in the details of the structure here described, and I have illustrated in Fig. 9 one modification of the cam and lever mechanism as illustrative of such equivalents which I consider as falling within the scope of my invention. The support 2' carries at its upper end a vertical portion 1' and to this is secured a vertically arranged plate 6', which in turn carries a combined guideway and cam member 8', the edges 7' of which constitute the guideway. Spacing members 10', through which pass the screws 4' connecting the plates 6' and 8', separate these plates. In the plate 8' is a long aperture having concave side edges 12' acting as cam surfaces. The plate holder 14', indicated in dotted lines, is supported on a plate 18', the side edges of which are turned over at 19' to engage the guiding edges 7', and riveted to this plate is a downwardly extending arm or support 24'.

In this form I have chosen to have the two levers 28' of elbow shape and mounted on separate pivots 30'. Each of these levers carries at the end of one arm a pivot 31' about which is a roller 32' engaging the corresponding concave cam surface, and to the end of each lever is pivotally connected at 29' a link 26' which is in turn pivoted at 27' to the support 21', which has bent over edges 22' engaging the guide edges 7'. This carries the lens holder 15' by means of screws 23' engaging in slots 50' in the foot 49' of the lens holder 15'

It will be understood that while I have described a negative holder, any form of transparency may be used in this holder, or, if desired, a sensitized sheet may be placed here and the image of a design or object on the easel impressed thereon. But in every case the lens maintains in focus upon a fixed plane outside of the camera an image of the surface of the sheet in the holder.

By mounting the cam member, as well as the guideway, close to the camera parts and over the easel area, it is not necessary to provide long levers or other members between the movable camera elements and the automatic controlling elements which members are liable to distortion and inaccuracy, as there is an immediate connection between these parts. Whereas, as is here intended, apparatus is frequently taken down and mounted again for use, it is necessary to provide an instrument which will be rugged in its character and not easily thrown out of adjustment, and this is provided by the arrangement here described.

Although this apparatus has been termed "enlarging camera", it is to be understood that while it customarily would be used for making enlargements, the size of the projected image would depend upon the design of the parts and the position of the camera, and that copying and reducing can be done as well as enlarging.

Obviously numerous modifications are possible and I contemplate as within the scope of my invention as defined in the appended claims all such alternative and equivalent structures.

Having thus described my invention, what I claim as new and desire to secure by Letters Patent is:

1. Photographic apparatus comprising a rigid support having a fixed cam surface, two camera parts slidable on said support, and a member pivotally connected to one holder and having a slidable relation with the cam and an operative relation with the other holder.

2. Photographic apparatus comprising a support with a fixed longitudinal guideway and a fixed cam surface, a lens support slidable on said guideway and carrying a member pivoted thereto and having a slidable relation with said cam surface, and a negative holder also slidable on said guideway and having an operative relation with said member.

3. Photographic apparatus comprising a rigid support having a fixed cam surface, a lens holder and a negative holder slidable on said support, and lever mechanism pivotally connected to both said holders and having a slidable relation with said cam surface.

4. Photographic apparatus comprising a rigid support having a fixed, convex cam surface, a lens holder and a negative holder slidable on said support, and lever mechanism pivotally connected to both said holders and having a slidable contact with said cam surface.

5. Photographic apparatus comprising a rigid support with vertical, straight, rigid guideways and a fixed cam surface, a negative holder mounted to slide on said guide, a lens holder adapted also to slide on said guide, and lever mechanism pivotally connected to both holders and having an extension adapted to bear against said cam.

6. Photographic apparatus comprising a rigid support provided with fixed slideways and a fixed cam surface, a lens holder carrying a lens and a negative holder, the two holders being slidable on said ways, and a lever mechanism pivotally connected to both said holders, and having a sliding relation to the cam surface, the cam and mechanism being so designed with reference to the lens that the holders may be simultaneously moved on the ways and that the lens will automatically maintain in focus on a predetermined fixed plane an image of a sheet carried by the negative holder.

7. Photographic apparatus comprising a rigid support, a lens holder carrying a lens and mounted to slide vertically on said support, a negative holder adapted to hold a flat sheet securely therein and mounted to slide vertically on said support, a member rigid with said support and having a fixed cam surface, and a lever mechanism having pivotal connection with said holders and a sliding relation with said cam surface, the cam and mechanism being so designed that the holders may be simultaneously moved, and that the lens will automatically maintain in focus on a fixed predetermined plane an image of a sheet carried by the negative holder.

8. Photographic apparatus comprising a rigid support having a plurality of fixed cam surfaces, a lens holder and a negative holder slidable on said support, and lever mechanism pivotally connected to both said holders and having a plurality of extensions, each of which has sliding contact with a cam surface.

9. Photographic apparatus comprising a rigid support having two symmetrically arranged cam surfaces, a lens holder and a negative holder slidable on said support, and lever mechanism pivotally connected to both said holders and having two extensions, each having sliding contact with one cam surface.

10. Photographic apparatus comprising a rigid support having two fixed cam surfaces, a lens holder and a negative holder slidable on said support, and two levers each pivotally connected with both holders and one having a slidable relation with one cam surface, and the other with the other cam surface.

11. Photographic apparatus comprising a rigid support having fixed slideways and two symmetrically arranged fixed cams thereon, a lens holder carrying a lens, a negative holder adapted to hold a flat sheet, said holders being slidable on said ways, and mechanism comprising two levers each pivotally connected with both holders and one having a slidable relation with one cam, and the other with the other cam, the cams and mechanism being so designed that the holders may be simultaneously moved on the slideways and the lens will automatically maintain in focus on a fixed predetermined plane an image of a sheet carried by the negative holder.

12. Photographic apparatus comprising a rigid support having two symmetrically arranged, outwardly directed, convex cam surfaces, a lens holder and a negative holder slidable on said support, a mechanism comprising two levers and two links, each of said levers being pivoted to one of said holders and connected to the other holder by one of said links which is pivoted to said lever and to the other holder, one of said levers having sliding contact with one of said cams, and the other of said levers with the other cam.

13. Photographic apparatus comprising a rigid support having fixed slideways and two outwardly directed, symmetrically arranged, convex cam surfaces, a lens holder carrying a lens, a negative holder adapted to carry a flat sheet, said holders being slidable on said ways, and mechanism comprising two levers each pivotally connected with both holders and one lever having slidable contact with one cam, and the other lever with the other cam, the cams and mechanism being so designed that the holders may be simultaneously moved on the slideways, and the lens will automatically maintain in focus on a fixed, predetermined plane an image of the sheet carried by the negative holder.

14. Photographic apparatus comprising a rigid support having two fixed cam surfaces thereon, a lens holder and a negative holder slidably carried on said support, and lever mechanism comprising two levers pivoted on a common pivot to one holder, and pivotally connected to the other holder, one having a slidable relation to one cam, and the other to the other cam.

15. Photographic apparatus comprising a rigid support having two fixed cam surfaces, a lens solder and a negative holder slidably carried on said support, and lever mechanism comprising two crossed levers pivoted on a common pivot to one holder, and pivotally connected to the other holder, one having a slidable relation to one cam and the other to the other cam.

16. Photographic apparatus comprising a rigid support having two symmetrically arranged, outwardly directed, convex cam surfaces, a lens holder and a negative holder slidable on said support, a mechanism comprising two crossed levers and two links, the levers being pivoted on a common pivot to one holder, and each lever connected to the other holder by one of said links which is pivoted to said lever and to the other holder, one of said levers having slidable contact with one of said cams and the other of said levers with the other cam.

17. Photographic apparatus comprising a rigid frame having at its lower end a clamp adapted to grasp firmly the edge of an easel and hold such easel in a definite plane relative to the frame, the frame having at its upper end guideways perpendicular to such plane, and a camera slidable on said guideways, and automatic focusing mechanism connecting the frame and camera parts, the guideways and all of the mechanism overhanging the aforesaid plane opposite a point in the central portion of the field of the camera.

18. Photographic apparatus comprising a rigid frame having at its lower end a clamp adapted to grasp firmly the edge of an easel, and hold such easel in a definite plane relative to the frame, the frame having at its upper end guideways perpendicular to such plane, and having a cam surface adjacent the guideways and a camera slidably supported on said guideways, and automatic focusing mechanism between the camera and cam surfaces, and the guideways and mechanism overhanging said plane opposite a point in the central part of the field of the camera.

19. Photographic apparatus comprising a rigid frame having at its lower end a clamp with a rigid face adapted to be clamped firmly upon the edge of an easel, thus rigidly positioning the frame and easel with respect to each other, the frame continuing at an oblique angle to such face, and supporting on its upper end a rigid guideway perpendicular to the plane of the clamp face and in a position to overhang an easel secured by the clamp, and a camera adjustable on the guideways, the inclination and length of the oblique portion of the frame being such that this portion and the clamp are outside of the useful field of the camera.

20. Photographic apparatus comprising a rigid frame having at its lower end means for securing the frame to an easel whereby the easel and frame are held in fixed relative position, said means including a member rigid with the frame and having a flat surface adapted to engage and position the upper surface of the easel, the frame continuing at an oblique angle to such surface, and supporting on its upper end a camera adjustable perpendicularly to said surface, the inclination and length of the oblique portion of the frame being such that this portion and the securing means are outside of the useful field of the camera.

21. Photographic apparatus comprising a rigid support having a fixed cam surface, a lens holder and a negative holder both movable longitudinally on said support and a lever, the lever at one end having slidable engagement with the cam surface, at an intermediate point being pivoted to the negative solder, and at the other end having a connection with the lens holder, said connection comprising the pivoted link.

22. Photographic apparatus comprising a rigid support having a fixed cam surface, a lens holder and a negative holder both movable longitudinally on said support and a lever, the lever at one end having slidable engagement with the cam surface, at an intermediate point being pivoted to the negative holder, and at the other end having a connection with the lens holder, said connection comprising a pivoted link and a member longtidunially adjustable with respect to the lens holder.

23. Photographic apparatus comprising a rigid support having a cam surface and a guideway, a negative holder movable longitudinally of said guideway, a lever pivoted to said lens holder, and engaging the cam surface whereby movement of the negative holder will rock the lever, a lens holder movable longitudinally of the support, and a connection between one end of the lever and said lens holder, said connection being adjustable permitting a longitudinal setting of the lens holder with respect to the lever.

Signed at Urbana, Ill., this 5th day of May, 1921.

EDWIN C. FRITTS.